US012705469B2

(12) United States Patent
Haykal et al.

(10) Patent No.: US 12,705,469 B2
(45) Date of Patent: Aug. 11, 2026

(54) MACHINE LEARNING INFERENCE SERVICE DISAGGREGATION

(71) Applicant: Google LLC, Mountain View, CA (US)

(72) Inventors: Salem Elie Haykal, Seattle, WA (US); Arvind Krishnamurthy, Seattle, WA (US); Chang Lan, Kirkland, WA (US); Soroush Radpour, Vancouver (CA)

(73) Assignee: Google LLC, Mountain View, CA (US)

(*) Notice: Subject to any disclaimer, the term of this patent is extended or adjusted under 35 U.S.C. 154(b) by 1091 days.

(21) Appl. No.: 17/842,910

(22) Filed: Jun. 17, 2022

(65) Prior Publication Data

US 2023/0409889 A1 Dec. 21, 2023

(51) Int. Cl.

| | |
|---|---|
| ***G06N 3/063*** | (2023.01) |
| ***G06F 9/50*** | (2006.01) |
| ***G06N 3/047*** | (2023.01) |
| ***G06N 3/08*** | (2023.01) |

(52) U.S. Cl.

CPC ............ *G06N 3/063* (2013.01); *G06N 3/047* (2023.01); *G06N 3/08* (2013.01); *G06F 9/5011* (2013.01)

(58) Field of Classification Search

None

See application file for complete search history.

(56) References Cited

U.S. PATENT DOCUMENTS 12,189,717 B1 * 1/2025 Karakus ................ G06F 9/4881
2019/0286973 A1 * 9/2019 Kovvuri ................ G06N 3/063
2020/0042362 A1 2/2020 Cui et al.
2021/0264220 A1 * 8/2021 Wei ...................... G06N 3/0442
2021/0295166 A1 * 9/2021 Rouhani .............. G06N 3/0464
2021/0382754 A1 * 12/2021 Nimmagadda .......... G06N 3/08
2021/0398021 A1 * 12/2021 Vaishampayan ....... G06N 20/00
2022/0109742 A1 * 4/2022 Kumar .................. G06F 9/5094
2022/0198217 A1 * 6/2022 Dong ................... G06N 3/0464
2022/0391665 A1 * 12/2022 Zhang ...................... G06N 3/04
2022/0414438 A1 * 12/2022 Zhou ...................... G06N 3/063
2023/0053575 A1 * 2/2023 Marche ................ G06N 3/0464
2023/0144662 A1 * 5/2023 Tasinga .................... G06N 3/09 718/105
2023/0281463 A1 * 9/2023 Kulkarni ................ G06N 3/045 706/26

(Continued)

FOREIGN PATENT DOCUMENTS

CN 111611087 B * 3/2023 ............ G06F 9/505

OTHER PUBLICATIONS

Shen et al. Nexus: A GPU Cluster Engine for Accelerating DNN-Based Video Analysis. Oct. 27, 2019. SOSP '19: Proceedings of the 27th ACM Symposium on Operating Systems Principles. pp. 322-337.

(Continued)

*Primary Examiner* — Abu Zar Ghaffari
(74) *Attorney, Agent, or Firm* — Lerner David LLP

(57) ABSTRACT

Aspects of the disclosure are directed to performing disaggregation-aware model graph partitioning, which can include provisioning and load balancing disaggregated resource pools, such as general purpose processors, accelerators, general purpose memory, and high bandwidth memory. Across these disaggregated resource pools, machine learning model operations can be packed and/or batched. The partitioning can further include automatically tuning runtime parameters.

18 Claims, 10 Drawing Sheets

(56) References Cited

U.S. PATENT DOCUMENTS

2024/0054384 A1* 2/2024 Catron .................. G06F 9/5061

OTHER PUBLICATIONS

International Search Report and Written Opinion for International Application No. PCT/US2023/018892 dated Jul. 6, 2023. 13 pages.
Xie et al. A Transferable Approach for Partitioning Machine Learning Models on Multi-Chip-Modules. arxiv.org, Cornell University Library, 201 Olin Library Cornell University Ithaca, NY 14853, Dec. 7, 2021 (Dec. 7, 2021), 12 pages.

* cited by examiner

MACHINE LEARNING INFERENCE SERVICE DISAGGREGATION

BACKGROUND

Machine learning inference increasingly relies on accelerators to attain latency, throughput, and efficiency targets to enable launching more computationally and memory intensive machine learning model architectures. However, there is a wide variance in types of workloads and resource needs depending on data modality as well as model architecture being used. This presents a challenge in designing hardware platforms and systems to adequately support these workloads without wasting resources. For example, some workloads are more central processing unit (CPU) host intensive and underutilize the accelerators while other workloads are more accelerator intensive and underutilize the CPU host. As another example, some workloads rely on large host memory, such as RAM, while other workloads rely more heavily on accelerator high bandwidth memory (HBM). Fixed machine configurations cannot efficiently enable running such a wide gamut of workloads. Further, existing virtualization technology, like virtual graphics processing units (vGPUs) or multi-instance GPUs (MIGs), requires fixed CPU to accelerator ratios and memory constraints on a single machine.

BRIEF SUMMARY

Aspects of the disclosure are directed to an approach that performs disaggregation-aware machine learning model graph partitioning. The approach provisions and load balances disaggregated resource pools. The approach also packs and/or batches machine learning model operations across the disaggregated resource pools. The approach can enable step function gains in performance.

An aspect of the disclosure provides for a method for performing machine learning model disaggregation. The method includes profiling, with one or more processors, one or more machine learning models with a sample dataset; determining, with the one or more processors, a resource threshold to perform a machine learning application based on the machine learning model profiling; determining, with the one or more processors, a partition for the machine learning model based on the machine learning model profiling and a data transfer threshold; and partitioning, with the one or more processors, the machine learning model into a plurality of host nodes and at least one accelerator node based on the determined partition and resource threshold.

In an example, the host nodes each include a processor for parsing operations and a memory comprising embedding tables. In another example, the accelerator node includes a machine learning accelerator for neural network operations and a high bandwidth memory including model parameters or embedding tables.

In yet another example, the data transfer threshold includes at least one of a network bandwidth, latency, or throughput threshold to reduce hops between the host nodes and the accelerator node. In yet another example, determining a partition for the machine learning model is further based on connectivity topologies. In yet another example, connectivity topologies include at least one of slicing of accelerators or hierarchies of network topologies. In yet another example, determining a partition for the machine learning model is further based on a statistical distribution of the machine learning model.

Another aspect of the disclosure provides for a system including one or more processors; and one or more storage devices coupled to the one or more processors and storing instructions that, when executed by the one or more processors, causes the one or more processors to perform operations for machine learning model disaggregation. The operations include profiling one or more machine learning models with a sample dataset; determining a resource threshold to perform a machine learning application based on the machine learning model profiling; determining a partition for the machine learning model based on the machine learning model profiling and a data transfer threshold; and partitioning the machine learning model into a plurality of host nodes and at least one accelerator node based on the determined partition and resource threshold.

In an example, the host nodes each include a processor for parsing operations and a memory comprising embedding tables. In another example, the accelerator node includes a machine learning accelerator for neural network operations and a high bandwidth memory including model parameters or embedding tables.

In yet another example, the data transfer threshold includes at least one of a network bandwidth, latency, or throughput threshold to reduce hops between the host nodes and the accelerator node. In yet another example, determining a partition for the machine learning model is further based on connectivity topologies. In yet another example, connectivity topologies include at least one of slicing of accelerators or hierarchies of network topologies. In yet another example, determining a partition for the machine learning model is further based on a statistical distribution of the machine learning model.

Yet another aspect of the disclosure provides for a non-transitory computer readable medium for storing instructions that, when executed by one or more processors, causes the one or more processors to perform operations for machine learning model disaggregation. The operations include profiling one or more machine learning models with a sample dataset; determining a resource threshold to perform a machine learning application based on the machine learning model profiling; determining a partition for the machine learning model based on the machine learning model profiling and a data transfer threshold; and partitioning the machine learning model into a plurality of host nodes and at least one accelerator node based on the determined partition and resource threshold.

In an example, the host nodes each include a processor for parsing operations and a memory comprising embedding tables. In another example, the accelerator node includes a machine learning accelerator for neural network operations and a high bandwidth memory including model parameters or embedding tables.

In yet another example, the data transfer threshold comprises at least one of a network bandwidth, latency, or throughput threshold to reduce hops between the host nodes and the accelerator node. In yet another example, determining a partition for the machine learning model is further based on connectivity topologies, the connectivity topologies including at least one of slicing of accelerators or hierarchies of network topologies. In yet another example, determining a partition for the machine learning model is further based on a statistical distribution of the machine learning model.

DETAILED DESCRIPTION

Figure 1:
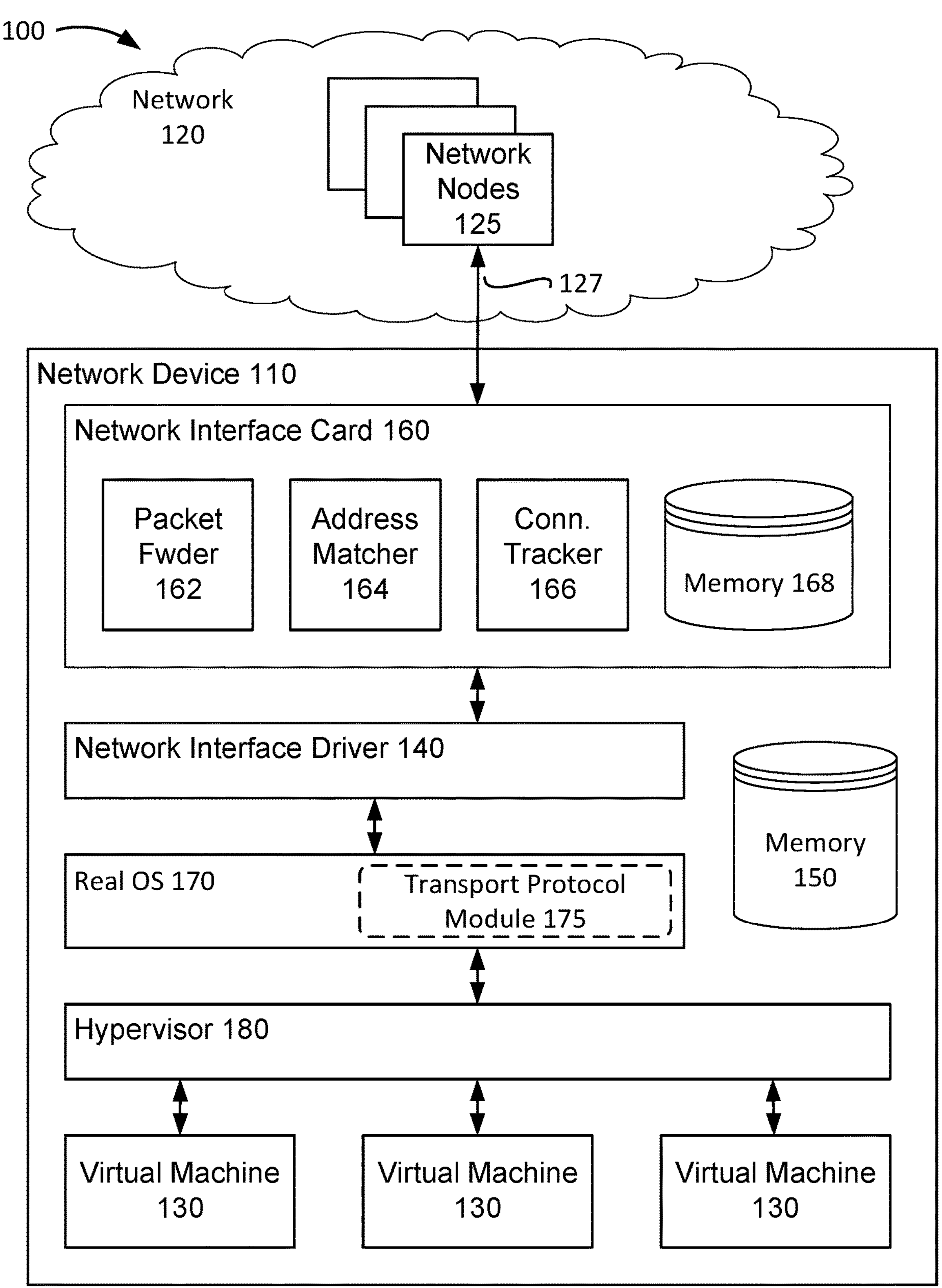
FIG. 1 depicts a block diagram of an example network environment with a network device according to aspects of the disclosure.

Generally disclosed herein are implementations for performing disaggregation-aware machine learning model graph partitioning. The implementations can include provisioning and load balancing disaggregated resource pools, such as general purpose processors, accelerators, general purpose memory, and high bandwidth memory. Across these disaggregated resource pools, machine learning model operations can be packed and/or batched. The implementations can further include automatically tuning runtime parameters. Machine learning accelerator disaggregation can enable step function gains in performance as machine configurations no longer need to be fixed.

The machine learning model graph partitioning can include virtualizing components of a machine learning model into a plurality of host nodes and one or more accelerator nodes. Each host node can include a general purpose processor, e.g., CPU, and a general purpose memory, e.g., RAM. The processor can include parsing and/or lookup operations and the memory can include embedding tables. Each accelerator node can include a machine learning accelerator, e.g., tensor processing unit (TPU). The machine learning accelerator can include deep neural network (DNN) operations and a high bandwidth memory (HBM). The HBM can include additional embedding tables and/or model parameters. Each accelerator node can also include a general purpose processor and general purpose memory. The host nodes and accelerator nodes can include a network interface card that connects to a network so that the nodes can interact with each other, e.g., transferring data.

The machine learning model graph partitioning can confer degrees of freedom in memory distribution. In one example, the ML model can be sharded across host and accelerator nodes, where the former can store embedding tables in RAM and the latter can store model parameters in HBM. In another example, the embedding tables can be stored in HBM while input layer concatenations can be executed on the accelerator node, which can reduce host node memory requirements and network byte transfers. The host and accelerator pools can also be auto-scaled separately.

The machine learning model graph can be partitioned based on a data transfer threshold, e.g., a cost of exchanging data between components over a network. The data transfer threshold can consider thresholds for network bandwidth, latency, and/or throughput to reduce hops between host and accelerator nodes. The amount of bytes being transferred should minimize disaggregation overhead. For example, a flow of bytes between two resulting sub-graphs of a partition should not cause a bottleneck due to network bandwidth.

The machine learning model graph can further be partitioned based on connectivity topology, e.g., an arrangement of host nodes, accelerator nodes, and interconnects. The connectivity topology can consider slicing of accelerators, e.g., 4×4 TPUs, and hierarchies of network topologies, e.g., interconnect then in-cluster then in-metro, to increase available throughput between physical nodes. For example, data transfer over an inter-carrier interconnect (ICI) is higher compared to a dynamic circuit network (DCN). As another example, nodes can be placed within the same rack.

The machine learning model graph can also be partitioned based on its statistical distribution. For example, top power law embedding table rows can be allocated to HBM while other embedding table rows can be allocated to RAM.

The machine learning model graph can further be partitioned based on a hardware resource threshold, e.g., a cost of the machine learning hardware itself. The machine learning model partition can consider different generations and/or types of accelerators and general purpose processors to reach a target throughput subject to latency constraints.

The machine learning model graph can also be partitioned based on various batch-sizes when considering a load demand. For example, running a matrix multiplication function with a low batch-size might not be as efficient, so an analysis can be performed for various batch sizes to determine the best configuration based on the demand of a received load.

The machine learning model graph partitioning can include a service control plane to offer additional degrees of freedom to compile/rewrite model graphs and automatically tune runtime parameters, e.g., operation placement, threading, accelerator-specific knobs. The service control plane can include a model profiler to execute profiling of machine learning models with a sample query set. The model profiler can enable prediction of values like average network bytes, kernel execution times, and peak HBM usage to aid in allocating host/accelerator nodes and avoiding out of memory (OOM) situations. When a model is deployed for inference, a user can pass a sample dataset from and the model profiler will run the model graph on that set and collect information regarding various resources used, e.g., CPU, RAM, TPU, HBM, network bandwidth. This information can be used to make better informed graph partitioning decisions.

The service control plane can further include a resource optimizer and a model optimizer. The resource optimizer can determine a resource threshold for performing a machine learning application, e.g., image classification, object detection, speech recognition, natural language processing, based on the results of the model profiler. The model optimizer can determine how to partition the machine learning model based on the results of the model profiler, taking into account factors such as the data transfer threshold, connectivity topology, and distributional statistics over model state.

The service control plane can also include a coordinator to confirm the partition decided by the model optimizer is possible based on the resource threshold from the resource optimizer. Once confirmed, the coordinator can perform the partition and dynamically auto-scale the disaggregated resource pools. Horizontal auto-scaling can be performed based on real-time resource usage of the disaggregated resource pools. For example, if TPU compute is close to maximum which results in capping throughput of the model, the coordinator can spin up more accelerator nodes to better balance the load.

FIG. 1 depicts a block diagram of an example network environment 100 with a network device 110. The network environment 100 includes a network 120 of interconnected network nodes 125. The network nodes 125 participate in the network 120 as data sources, data destinations or data sinks, and/or intermediary nodes such as switches, routers, and/or gateways propagating data from sources towards destinations through the network 120. The network nodes 125 can be host nodes or accelerator nodes, to be described further below. The network 120 includes the network device 110 with links 127 to various other participating network nodes 125.

The network 120 can facilitate interactions between participant devices. Example networks include the Internet, a local network, a network fabric, or any other local area or wide area network. The network 120 can be composed of multiple connected sub-networks or autonomous networks. The network 120 can be a local-area network (LAN), such as a company intranet, a metropolitan area network (MAN), a wide area network (WAN), an inter-network such as the Internet, or a peer-to-peer network. Any type and/or form of data network and/or communication network can be used for the network 120. The network can be public, private, or a combination of public and private. In general, the network 120 can be used to convey information between computing devices; for example, network nodes 125, and the network device 110.

The network device 110 can be a host device or server executing one or more virtual machines 130 on one or more CPUs or TPUs of the network device 110. The network device 110 can include a network interface driver 140, a memory 150, a network interface 160, a real operating system (OS) 170, a hypervisor 180, and the virtual machines 130. The network device 110 can communicate with other network devices over the network 120. The network device 110 and other network devices can create or participate in one or more virtual networks to facilitate communication between virtual machines 130. The one or more virtual networks can overlay the physical network that makes up the network 120. Data packets can be routed within one of the virtual networks overlaying the physical network using a system of data packet encapsulation. The network device 110 and the network nodes 125 can route the data packets according to virtual Internet protocol addresses (VIPs) and MAC addresses. In some examples, the network device 110 can host one or more virtual machines 130 that transmit data packets or receive data packets. In other examples, the network device 110 can be an intermediate node of a path between two virtual machines executing on two separate network devices. Accordingly, the network device 110 can act as a source, destination, or intermediate switch in one or more virtual networks.

The hypervisor 180 can manage operation of the virtual machines 130, including spinning up and terminating the virtual machines 130, managing allocation of memory 150 to the virtual machines 130, and live migrating the virtual machines 130 to other network devices.

The memory 150 can store data and/or computer executable instructions related to the operation and use of the network interface driver 140. The memory 150 can include a random access memory (RAM), a high bandwidth memory (HBM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory, as examples.

The memory 150 can store computer executable instructions of a transport protocol module 175, such as a transmission control protocol (TCP) module or the TCP layer of a network stack, to be executed on a processor of the network device 110. Functionality occurring within a TCP layer of a network stack can be additionally or alternatively executed in another network protocol module within the transport layer, the network layer, or a combined transport/network layer of a network stack. For example, the functionality can be implemented in a user datagram protocol (UDP) module, reliable datagram protocol (RDP) module, reliable user datagram protocol (RUDP) module, or a datagram congestion control protocol (DCCP) module. A network layer, a transport layer, or a combined transport/network layer can generally be referred to as a packet layer of a network stack.

The network interface driver 140 can include a network interface driver software module running on the real OS 170. As an example, the network interface driver can be a collection of computer executable instructions stored in the memory 150 that when executed by a processor help facilitate network communications. As another example, the network interface driver 140 can be implemented as logic in a hardware processor or other integrated circuit, or as a combination of hardware and software logic. The network interface driver 140 can communicate with one of the software virtual machines 130 directly or via a guest OS of the virtual machine 130 and/or the hypervisor 180.

The network interface driver 140 can be included within a layer of a network stack of the real OS 170 of the network device 110. In an example, the network interface driver 140 can be included within a data link layer of a network stack and can communicate with a software module or application that is included in an application layer of the network stack. In another example, the network interface driver 140 can be included within a link layer of a network stack and can communicate with a TCP/IP module that is included in an internet/transport layer of the network stack. In other examples, the functionality occurring within the layer of the network stack can additionally or alternatively be configured to receive packets from another network or transport layer protocol module, such as a user datagram protocol (UDP) module, reliable datagram protocol (RDP) module, reliable user datagram protocol (RUDP) module, or a datagram congestion control protocol (DCCP) module. While not shown, the network interface driver 140 can be included as a portion of the network interface 160.

The network interface card 160 can include a packet forwarder 162, an address matcher 164, a connection tracker 166, and a memory 168. The memory 168 can store data and/or computer executable instructions related to the operation and use of the network interface card 160. The memory 168 can include a random access memory (RAM), high bandwidth memory (HBM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory, as examples.

The packet forwarder 162 can be implemented in an application-specific integrated circuit (ASIC) or as software executing on a microprocessor. The packet forwarder 162 can receive packets for transmission from the virtual machines 130 and route them to one or more destination virtual machines executing on remote network devices. The packet forwarder 162 can also perform functions that allow the network interface 160 to act as a destination for data packets received over the links 127. For example, the packet forwarder 162 can receive a data packet over one of the lines 127, decapsulate the data packet, and forward the data packet to one or more destination virtual machines 130 executing on the network device 110.

The address matcher 164 can be implemented in an application-specific integrated circuit (ASIC) or as software executing on a microprocessor. As an example, the address matcher 164 can receive a data packet from a local virtual machine, i.e., a virtual machine 130 executing on the local network device 110, where the destination for the data packet is a virtual machine executing on a remote network device. The address matcher 164 can determine the destination virtual machine of the data packet based on the longest prefix match of a destination address of the data packet, where the destination address corresponds to the destination virtual machine. The address matcher 164 can select a path to the destination network device from a plurality of equal-cost multipath (ECMP) paths. The address matcher 164 can then encapsulate the data packet with an outer header having a second destination address that corresponds to the destination network device. The address matcher 164 can then transmit the encapsulated packet.

The connection tracker 166 can be implemented in an application-specific integrated circuit (ASIC) or as software executing on a microprocessor. As an example, the connection tracker 166 can perform firewall type functions whereby it monitors packets for transmission from the virtual machines 130 executing on the network device 110 destined for target virtual machines, hosts, or clients external to the network device 110. The connection tracker 166 can determine whether either or both of a source port number or a destination port number fall within a range of port numbers permitted by the policies imposed on the network device 110 and/or the virtual machines 130. In addition, the connection tracker 166 can record metadata regarding the data packet in a connection flow table or other log maintained in the network interface memory 168. In this manner, the connection tracker 166 can check port numbers and record log entries in hardware on the network interface driver 140; that is, between the processor of the network interface card 160 and the memory 168. If the connection tracker 166 determines that one of the port numbers is not within a permitted range, it can drop or block the data packet and can also send a notification to the virtual machine 130 and/or the hypervisor 180 notifying it of a possible breach of a network policy. If the port number is determined to be within range, the connection tracker 166 can insert an entry corresponding to the data packet in the connection flow table in the memory 168 and transmit the data packet.

Figure 2:
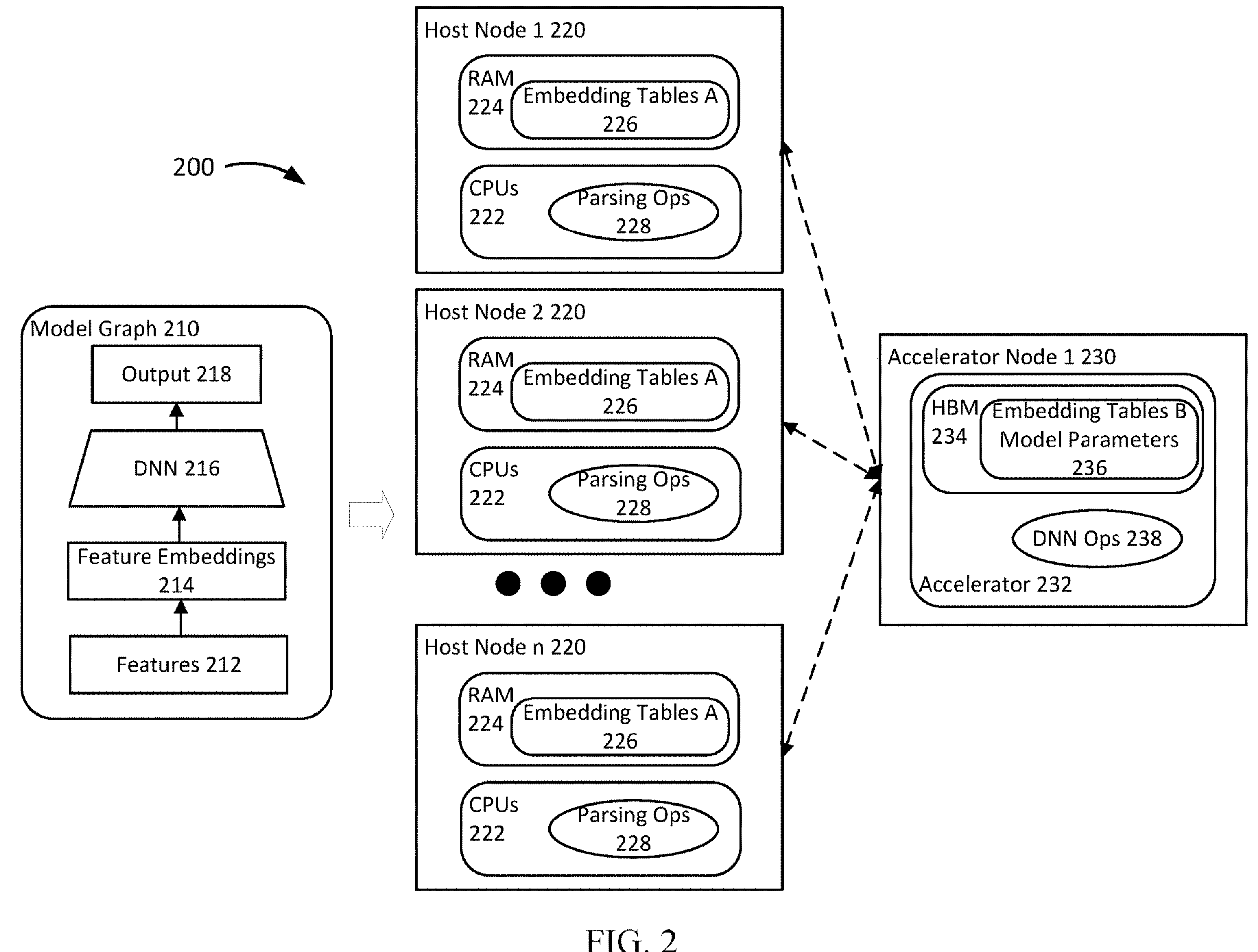
FIG. 2 depicts a block diagram of an example partition of a machine learning model graph into a plurality of host nodes and one or more accelerator nodes according to aspects of the disclosure.

FIG. 2 depicts a block diagram of an example partition 200 of a machine learning model graph 210 into a plurality of host nodes 220 and one or more accelerator nodes 230. The example machine learning model graph 210, such as for a deep neural network, can include a feature input layer 212, a feature embedding layer 214, one or more neural network layers 216, and an output layer 218. Features, which are measurable properties of an object being analyzed by the machine learning model graph 210, can be input at the feature input layer 212. The features can then be embedded at the feature embedding layer 214. Embeddings can be dense numerical representations of the object being analyzed and relationships expressed as vectors, where the vector space quantifies semantic similarity between features. Embeddings can be helpful with sparse categorical features to increase the accuracy of the neural network.

The embedded features can be input to the neural network layers 216. The neural network layers 216 can be referred to as hidden layers. Each node of the neural network layers 216 can be connected to each node in the feature input layer 212 or feature embedding layer 214 and each node in the output layer 218. Each node in the neural network layers 216 can be connected to each node in the next higher layer and next lower layer. Each node of the feature input layer 212 or feature embedding layer 214 represents a potential input to the machine learning model graph 210 and each node of the output layer 218 represents a potential output of the machine learning model graph 210. Each connection from one node to another node in the next layer may be associated with a weight or score. The machine learning model graph 210 can output a single output or a weighted set of possible outputs. The machine learning model graph 210 can be constructed with recurrent connections such that the output of a neural network layer 216 feeds back into the neural network layer 216 again for the next set of inputs.

The machine learning model graph 210 can be virtualized and partitioned into one or more host nodes 220 and one or more accelerator nodes 230. Each host node can include a general purpose processor 222, for example a CPU, and a general purpose memory 224, for example RAM. The general purpose memory 224 can store embedding tables 226 that contain the embedded features of the machine learning model graph 210. More generally, the general purpose memory 224 can store model states and host node states. Model states can include parameters in the model graph, such as embeddings and layer weights. Host node states can include a state of the particular node stored in the general purpose memory 224, as opposed to the accelerator HBM. The general purpose processors 222 can perform operations, such as parsing and/or lookup operations 228, using the embedded features stored in the embedding tables 226. The general purpose processors 222 can execute operations that cannot be accelerated or offloaded to accelerators.

Each accelerator node 230 can include a machine learning accelerator 232, for example a TPU. The machine learning accelerator 232 can include high bandwidth memory (HBM) 234 that can store model parameters and/or additional embedding tables 236. Different embedding tables can be included in the general purpose memory 224 and HBM 234 to decrease transfer overhead with disaggregation. The model parameters 236 can include weights and biases assigned to layers of a neural network. The machine learning accelerator 232 can further include neural network operations 238, such as linear algebra operations, using the model parameters and the embedded features stored in the embedding tables 236. While not shown, each accelerator node 230 can further include a general purpose processor and general purpose memory to drive the accelerator 232, e.g., execution runtime, and respond to control plane instructions.

While not shown, the host nodes 220 and accelerator nodes 230 can include a network interface card, such as the network interface card 160 of FIG. 1. The network interface card can connect to a network, such as network 120, so that the nodes can interact with each other. For example, the host nodes 220 and accelerator nodes 230 can transfer data packets between each other when performing machine learning applications.

The machine learning model partitioning can confer degrees of freedom in memory distribution. In one implementation, the machine learning model graph 210 can be sharded across host nodes 220 and accelerator nodes 230 where the former can store embedding tables 226 in general purpose memory 224 and the latter can store model parameters 236 in HBM 234. In another implementation, the embedding tables 236 can be stored in HBM 234 while input layer concatenations can be executed on the accelerator node 230. This implementation can reduce host node memory requirements and network byte transfers. The host and accelerator pools can also be auto-scaled separately.

Figure 3:
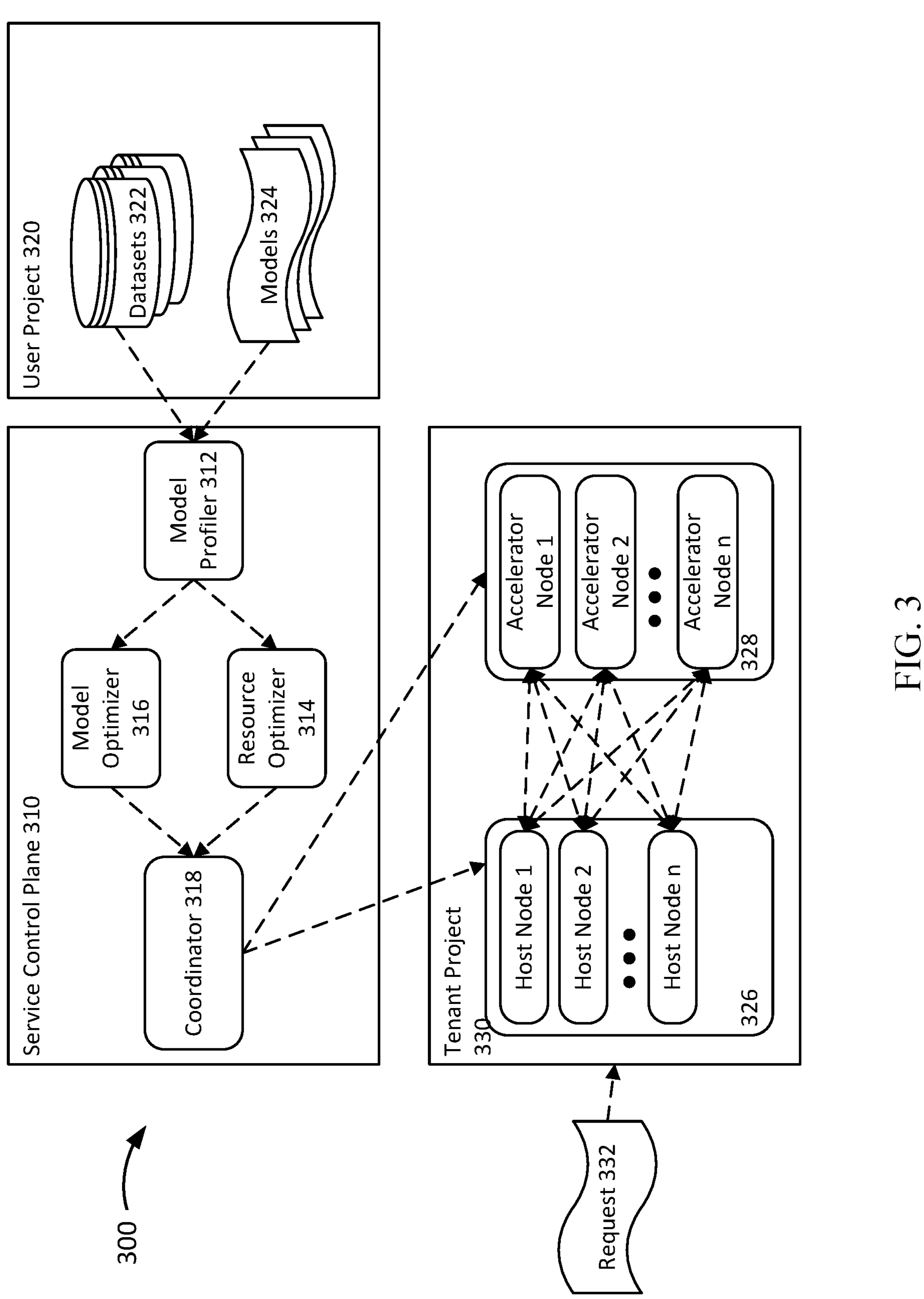
FIG. 3 depicts a block diagram of an example architecture for partitioning a machine learning model graph according to aspects of the disclosure.

FIG. 3 depicts a block diagram of an example architecture 300 for partitioning a machine learning model graph. The architecture can include a service control plane 310 to allow for degrees of freedom to compile and/or rewrite model graphs as well as automatically tune runtime parameters, such as operation placement, threading, and accelerator-specific knobs. The service control plane 310 can include a model profiler 312, resource optimizer 314, model optimizer 316, and coordinator 318.

The model profiler 312 can execute profiling of sample machine learning models 324 with a sample query dataset 322 of a user project 320. A user project 320 can be a project in a user space that is visible to end users of the elements of the service control plane 310. The model profiler 312 can enable prediction of values like average network bytes, kernel execution times, and peak HBM usage to aid in allocating host and accelerator nodes and avoiding out of memory (00M) situations. The model profiler 312 can run sample models 324 on sample datasets 322 to collect information regarding various resources used, such as general purpose processor usage, general purpose memory usage, accelerator usage, HBM usage, and network bandwidth. This information can be used to make better informed model graph partitioning decisions.

The resource optimizer 314 can determine a resource threshold for performing a machine learning application, such as image classification, object detection, speech recognition, natural language processing. The resource threshold can be selected based on the particular application or can be determined from results of the model profiler 312. The resource optimizer 314 can consider different generations and/or types of accelerators and general purpose processors to reach a target throughput subject to latency constraints.

The model optimizer 316 can determine how to partition the machine learning model graph based on factors such as data transfer threshold, connectivity topology, and/or distributional statistics over a model state, each factor to be described further below. The factors can be predetermined based on the particular machine learning application or can be determined from results of the model profiler 312.

The coordinator 318 can confirm the partition determined by the model optimizer 316 is possible based on the resource threshold from the resource optimizer 314. Once confirmed, the coordinator 318 can perform the partition of the model graph into a plurality of host nodes 326 and one or more accelerator nodes 328 of a tenant project 330. A tenant project 330 can be a project parallel to the user project 320 where most logic of the elements of the service control plane 310 run. The coordinator 318 can also dynamically auto-scale the disaggregated resource pools of host nodes 326 and accelerator nodes 328 based on real-time resource usage from user requests 332. For example, if accelerator compute is close to maximum, resulting in capping throughput of the partitioned model, the coordinator 318 can spin up more accelerator nodes 328 to better balance the load.

Figure 4:
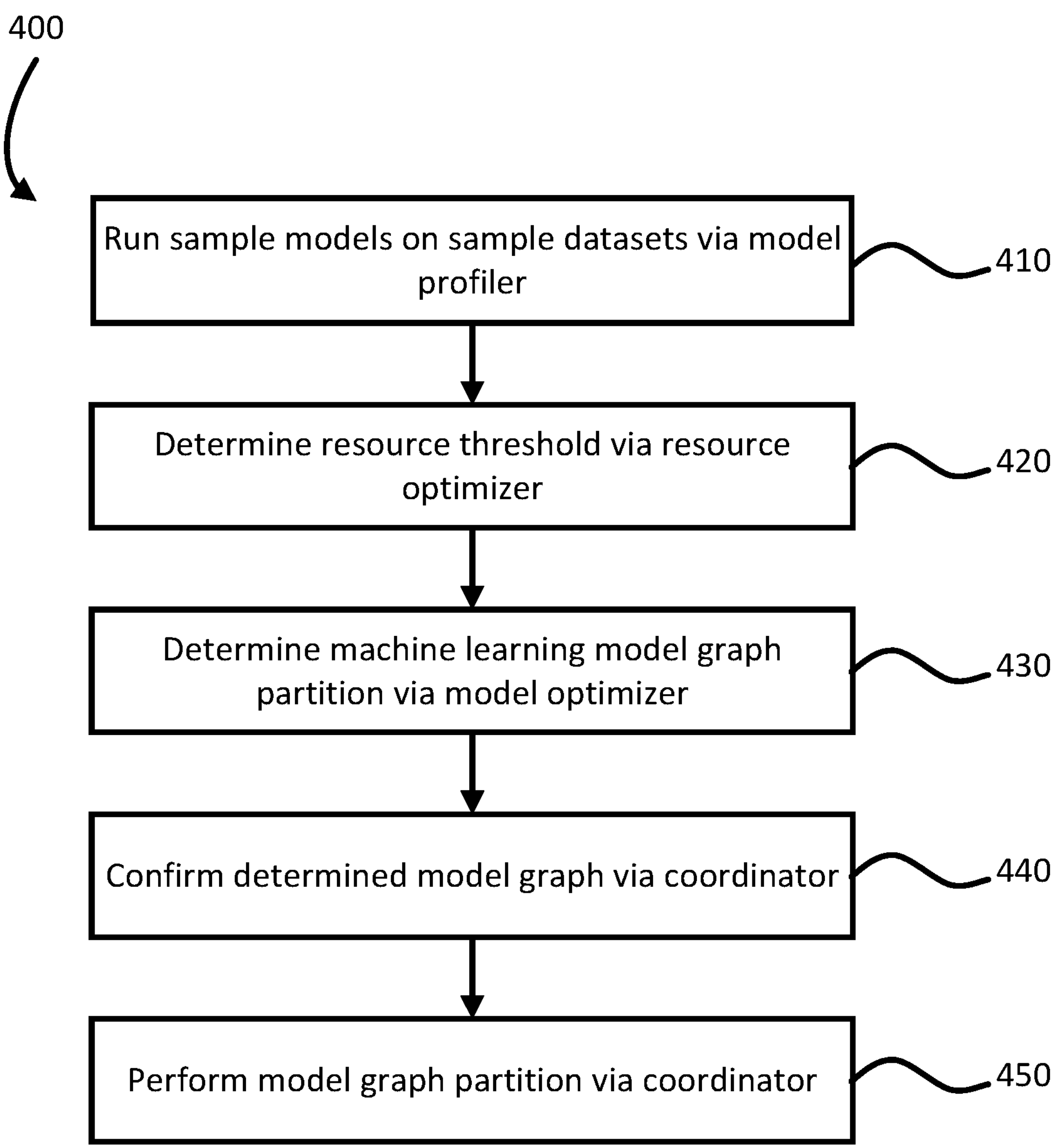
FIG. 4 depicts a flow diagram of an example process for partitioning a machine learning model graph according to aspects of the disclosure.

FIG. 4 depicts a flow diagram of an example process 400 for partitioning a machine learning model graph. The example process 400 can be performed on a system of one or more processors in one or more locations, such as the service control plane 310 of FIG. 3.

As shown in block 410, a model profiler can run sample models on sample datasets to collect information on various resources used to make better informed model graph partitioning decisions. The model profiler can consider general purpose processor usage, general purpose memory usage, accelerator usage, HBM usage, and/or network bandwidth to aid in allocating host and accelerator nodes.

As shown in block 420, a resource optimizer can determine a resource threshold for performing a machine learning application. The resource threshold can be selected based on the particular application or can be determined from results of the model profiler. The resource optimizer can consider different generations and/or types of accelerators and general purpose processors to reach a target throughput subject to latency constraints. The resource optimizer can also consider different generations and/or types of HBM and general purpose memory to reach a target available storage.

As shown in block 430, the model optimizer can determine how to partition the machine learning model graph based on factors such as data transfer threshold, connectivity topology, and/or distributional statistics over a model state. The factors can be selected based on the particular application or can be determined from results of the model profiler.

The model optimizer can partition the machine learning model graph based on a data transfer threshold, such as a cost of exchanging data between nodes over a network. The data transfer threshold can include thresholds for network bandwidth, latency, and/or throughput to reduce hops between host nodes and accelerator nodes. The amount of bytes being transferred should minimize disaggregation overhead. For example, a flow of bytes between two resulting sub-graphs of a partition should not cause a bottleneck due to network bandwidth.

The model optimizer can further partition the machine learning model graph based on connectivity topologies, such as an arrangement of host nodes, accelerator nodes, and interconnects. The connectivity topology can include slicing of accelerators, hierarchies of network topologies, and placement of nodes. The connectivity topology can be used to increase available throughput between physical nodes. Slicing of accelerators can include slicing an accelerator of an accelerator node so that host nodes can connect to individual slices of the accelerator rather than separate accelerator nodes. Hierarchies of network topologies can include ranking network connections. For example, data transfer over an interconnect can be higher than data transfer over an in-cluster connection, which can be higher than data transfer over an in-metro connection. Placement of nodes can include placing nodes physically closer to each other to increase available throughput, such as placing nodes within the same data center rack.

The model optimizer can also partition the machine learning model graph based on its statistical distribution. For example, top power law embedding table rows, e.g., rows that make up a top 10-20% of a power law distribution that are referenced by at least 80% of inference traffic, can be allocated to HBM while other embedding table rows, e.g., the torso and/or tail of the power law distribution, can be allocated to general purpose memory. The machine learning model graph can also be partitioned based on various batch-sizes and load demands of a machine learning application. For example, an analysis can be performed for various batch sizes to determine the best configuration based on the load demand for a machine learning application.

As shown in block 440, the coordinator can confirm the partition determined by the model optimizer is possible based on the resource threshold from the resource optimizer. The coordinator can confirm that the determined partition includes sufficient accelerators, high bandwidth memory, general purpose processors, and general purpose memory for performing a machine learning application.

As shown in block 450, the coordinator can perform the partition of the machine learning model graph into a plurality of host nodes and accelerator nodes when confirmed.

Figure 5:
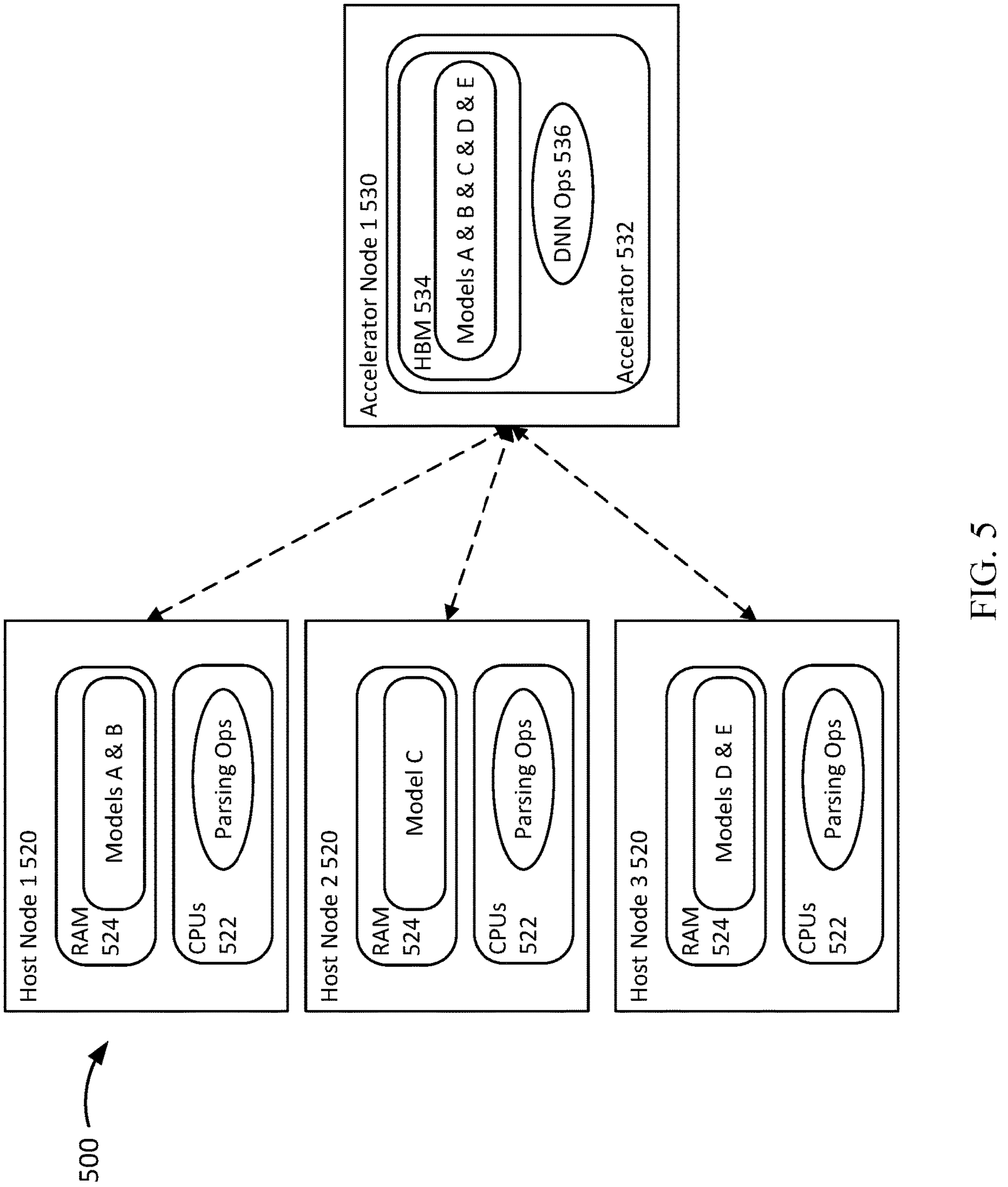
FIG. 5 depicts a block diagram of an example partition of a machine learning model graph for model packing according to aspects of the disclosure.

FIG. 5 depicts a block diagram of an example partition 500 of a machine learning model graph into a plurality of host nodes 520 and one or more accelerator nodes 530, illustrating model packing. As described earlier, each host node 520 includes general purpose processors 522 for parsing operations and general purpose memory 524, and each accelerator node 530 includes an accelerator 532 having a HBM 534 and neural network operations 536. Here, the host nodes 520 can store one or more models in the general purpose memory 524. For example, models A and B are stored in host node 1, model C is stored in host node 2, and models D and E are stored in host node 3. The accelerator node 530 that the host nodes 520 are connected to can store the aggregate of the models in the HBM 534. For example, since accelerator node 1 is connected to the three host nodes, models A-E are stored in HBM of accelerator node 1. Disaggregation can offer an additional degree of freedom into packing different models in host nodes or accelerator nodes. Model packing can be helpful for low queries per second large models for a machine learning application where general purpose memory or HBM is limited. The coordinator 316 can track the different models stored in the same general purpose memory and properly direct traffic to the appropriate model.

Figure 6:
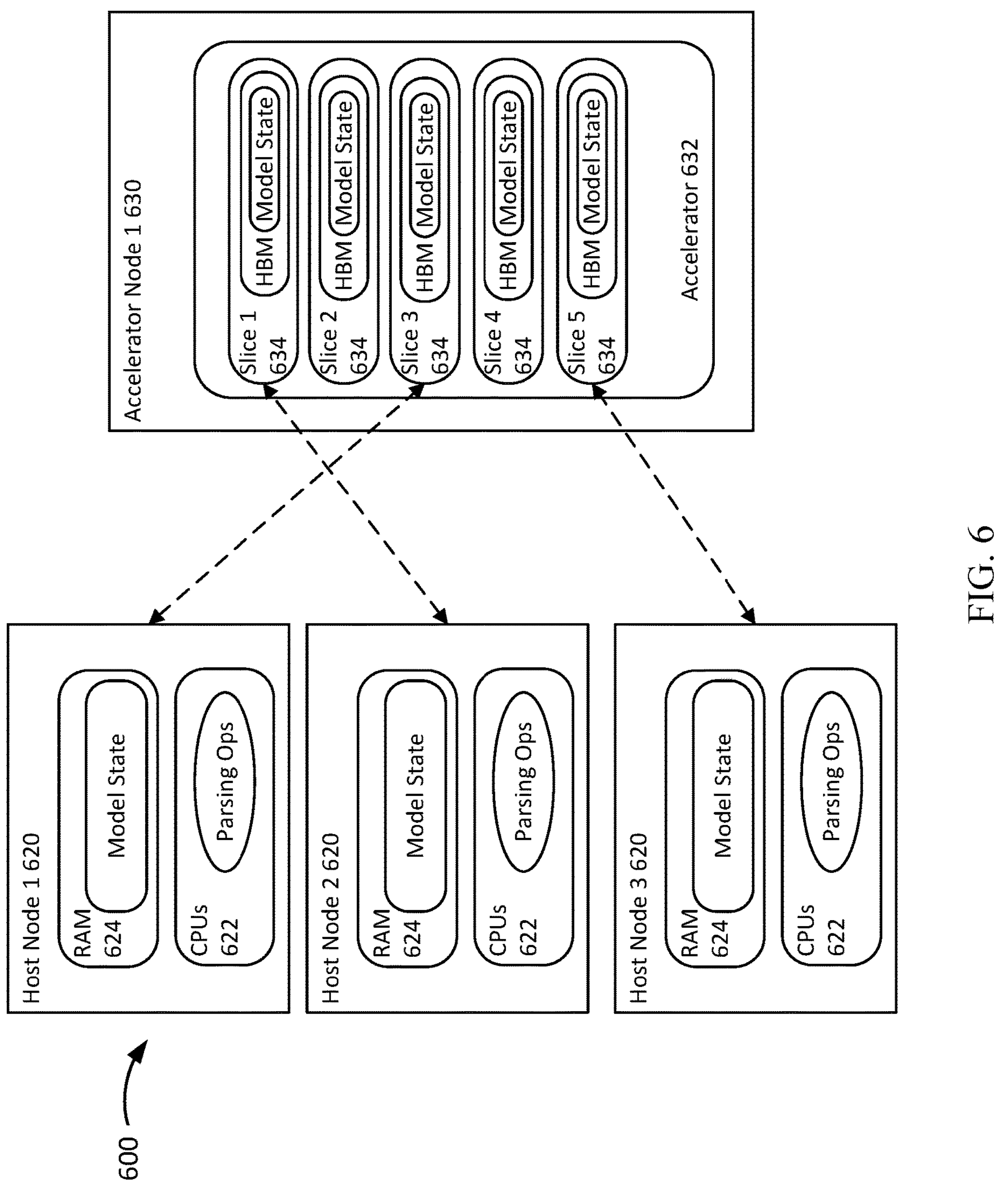
FIG. 6 depicts a block diagram of an example partition of a machine learning model graph for accelerator slicing according to aspects of the disclosure.

FIG. 6 depicts a block diagram of an example partition 600 of a machine learning model graph into a plurality of host nodes 620 and one or more accelerator nodes 630, illustrating accelerator slicing. Each host node 620 can include general purpose processors 622 for parsing operations and general purpose memory 624, and each accelerator node 630 can include an accelerator 632 having a HBM and neural network operations. Here, the accelerator 632 of the accelerator node 630 can be statically sliced into several instances 634 to expand available accelerator nodes with negligible overhead. Each slice 634 includes its own HBM containing a model state. For purposes of exposing to users and memory management, each slice 634 can be treated separately. For example, host node 1 can be connected to slice 3, host node 2 can be connected to slice 1, and host node 3 can be connected to slice 5. At least one accelerator node 630 would still need to be allocated to contain the slices but utilizing slicing can be preferable to multiple accelerator nodes in some implementations.

Figure 7:
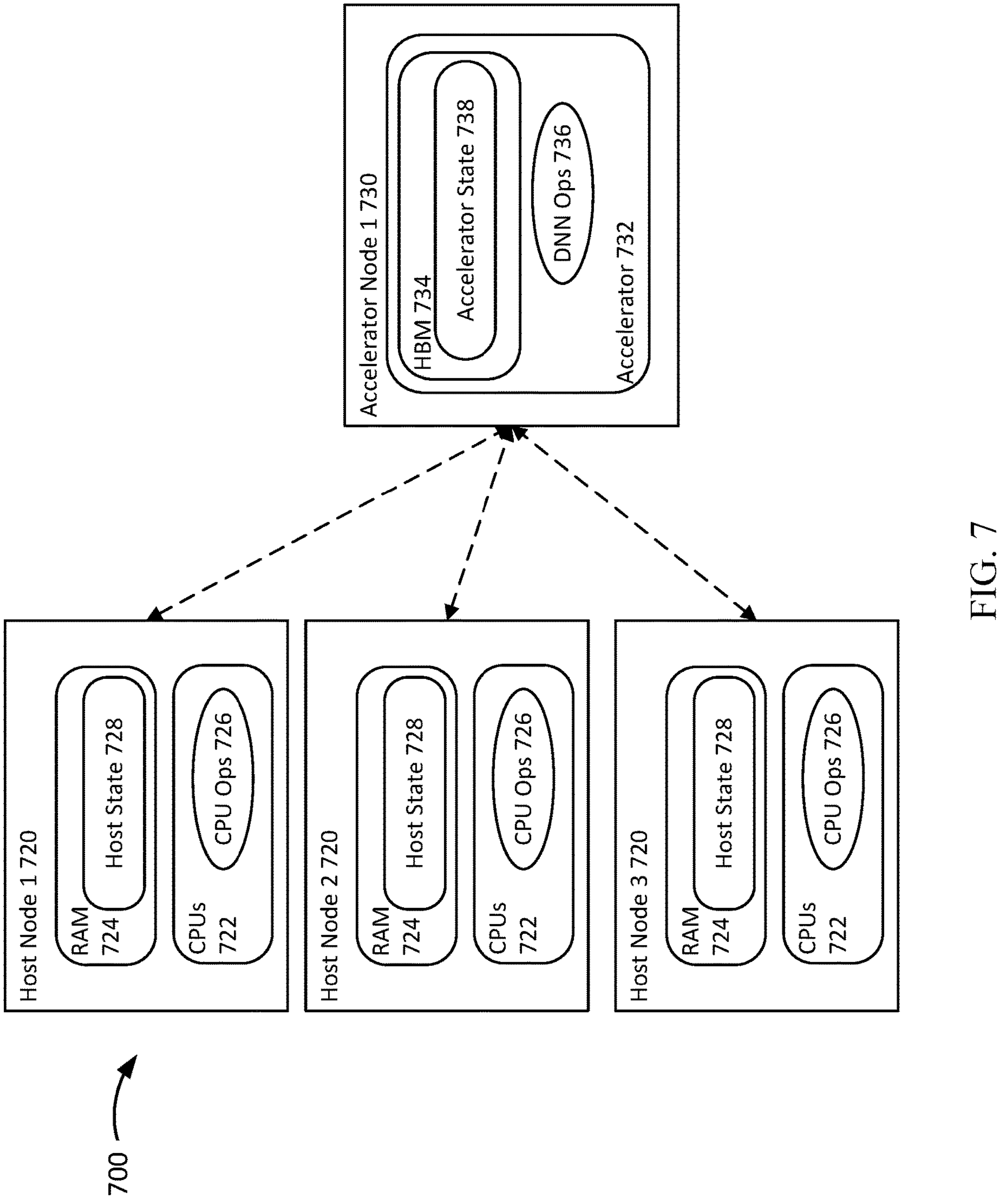
FIG. 7 depicts a block diagram of an example partition of a machine learning model graph for adaptive batching according to aspects of the disclosure.

FIG. 7 depicts a block diagram of an example partition 700 of a machine learning model graph into a plurality of host nodes 720 and one or more accelerator nodes 730, illustrating adaptive batching. Each host node 720 can include general purpose processors 722 for processing operations 726 and general purpose memory 724 containing a host state 728, and each accelerator node 730 can include an accelerator 732 having a HBM 734 and neural network operations 736, where the HBM 734 includes an accelerator state 738. Here, a fan-in pattern is depicted, where multiple host nodes, such as the three host nodes 720 depicted, batch on an accelerator node, such as accelerator node 730. Fan-in patterns are preferred for host-heavy models such as tabular use cases.

Figure 8:
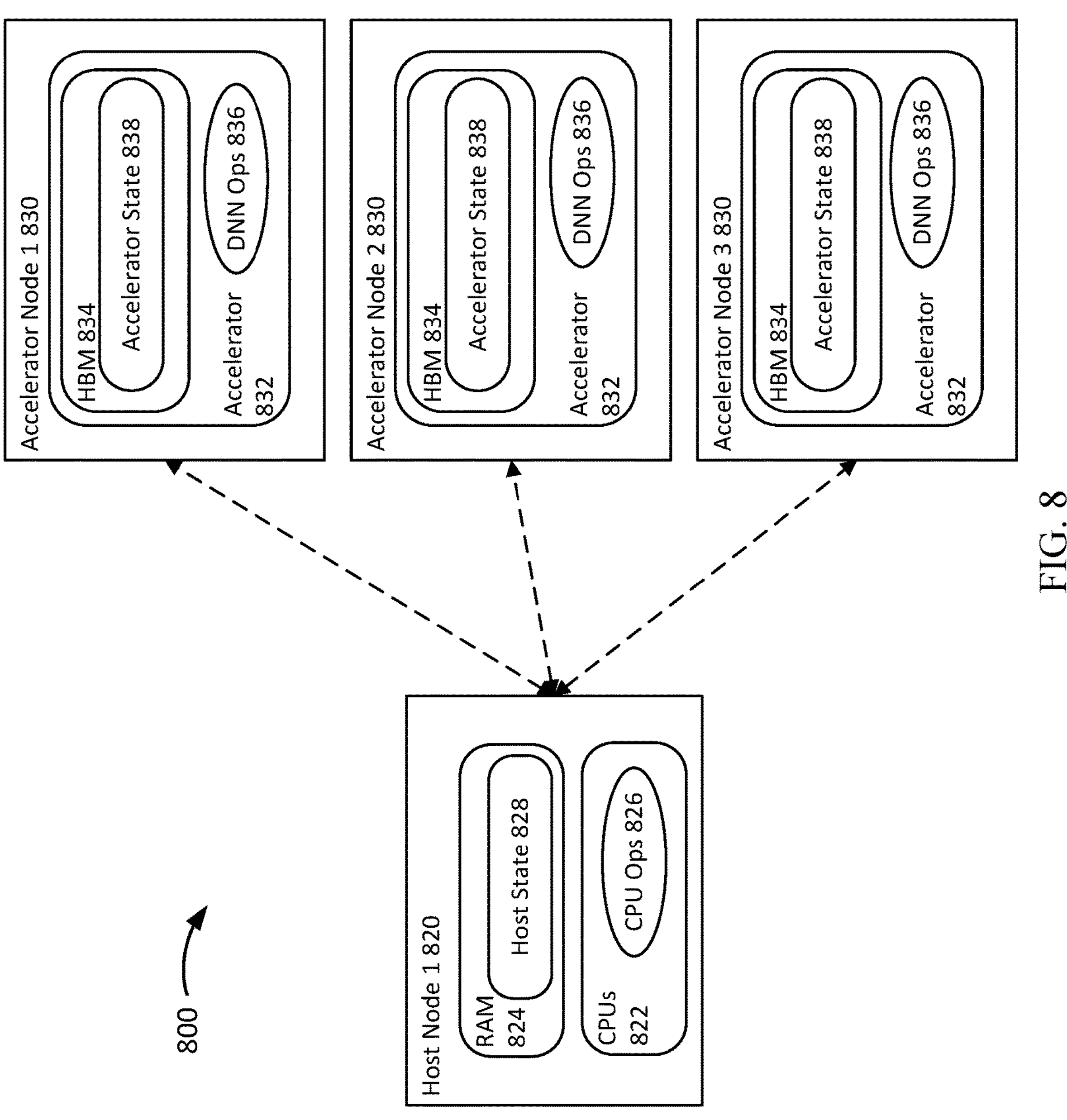
FIG. 8 depicts a block diagram of an example partition of a machine learning model graph for adaptive batching according to aspects of the disclosure.

FIG. 8 depicts a block diagram of an example partition 800 of a machine learning model graph into a plurality of host nodes 820 and one or more accelerator nodes 830, further illustrating adaptive batching. Each host node 820 can include general purpose processors 822 for processing operations 826 and general purpose memory 824 containing a host state 828, and each accelerator node 830 can include an accelerator 832 having a HBM 834 and neural network operations 836, where the HBM 834 includes an accelerator state 838. Here, a fan-out pattern is depicted, where multiple accelerator nodes, such as the three accelerator nodes 730 depicted, batch on a host node, such as the host node 820. Fan-out patterns are preferred for accelerator-heavy models such as natural language processing use cases.

Figure 9:
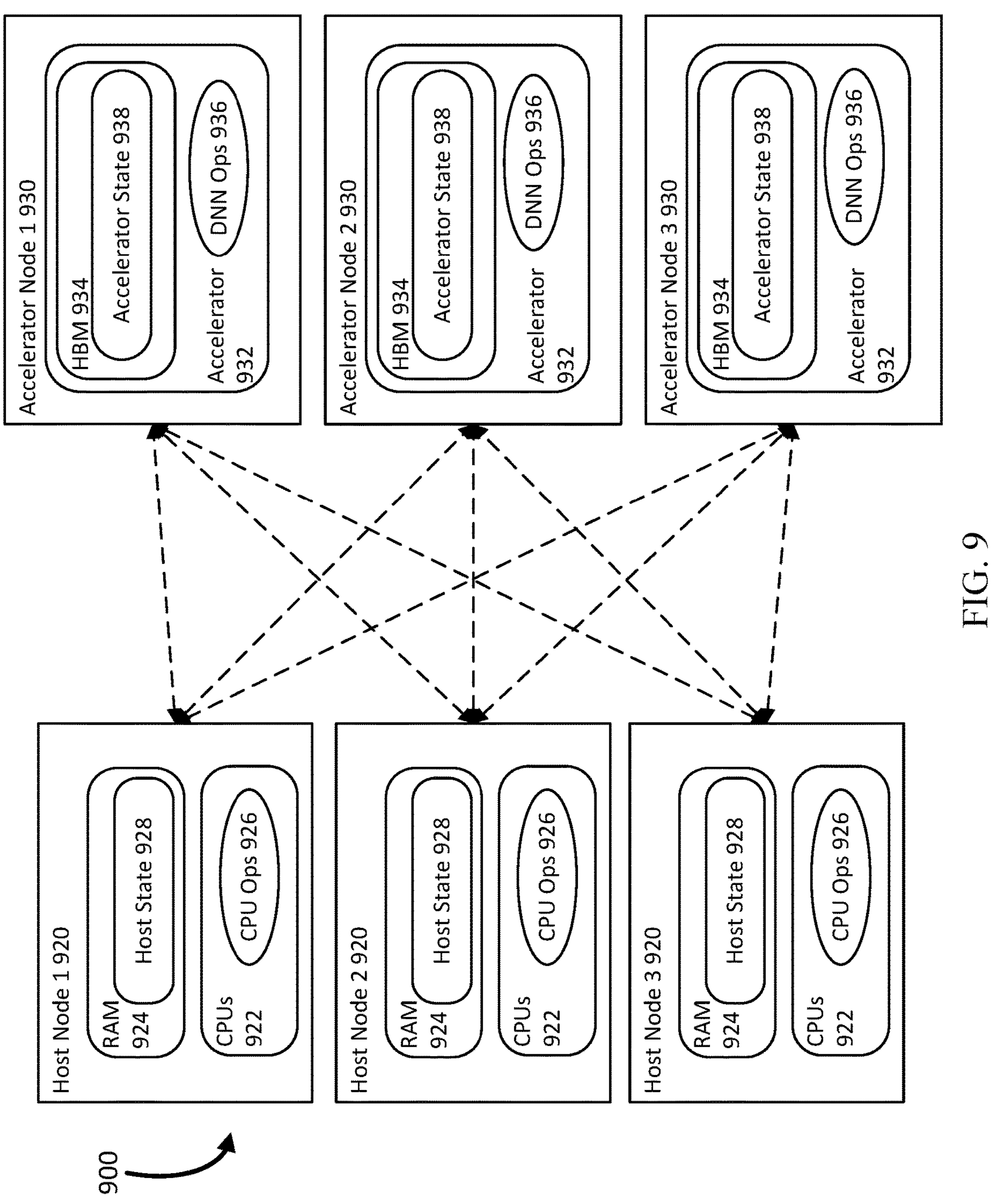
FIG. 9 depicts a block diagram of an example partition of a machine learning model graph for auto-scaling according to aspects of the disclosure.

FIG. 9 depicts a block diagram of an example partition 900 of a machine learning model graph into a plurality of host nodes 920 and one or more accelerator nodes 930, illustrating auto-scaling. Each host node 920 can include general purpose processors 922 for processing operations 926 and general purpose memory 924 containing a host state 928, and each accelerator node 930 can include an accelerator 932 having a HBM 934 and neural network operations 936, where the HBM 934 includes an accelerator state 938. Similar to batching, disaggregation introduces more degrees of freedom and more complexity to autoscaling of host pools and accelerator pools. The coordinator can dynamically auto-scale the disaggregated resource pools of host nodes 920 and accelerator nodes 930 based on real-time resource usage from user requests by refreshing local model dispatch tables on the host nodes 920. Auto-scaling can include creating or removing host nodes 920 or accelerator nodes 930 as well as forming connections between the host nodes 920 and accelerator nodes 930. For example, if accelerator compute is close to maximum, resulting in capping throughput of the partitioned model, the coordinator can spin up more accelerator nodes 930 to better balance the load. While three host nodes 920 and three accelerator nodes 930 are depicted, there can be any number of host nodes and accelerator nodes connected via autoscaling.

Figure 10:
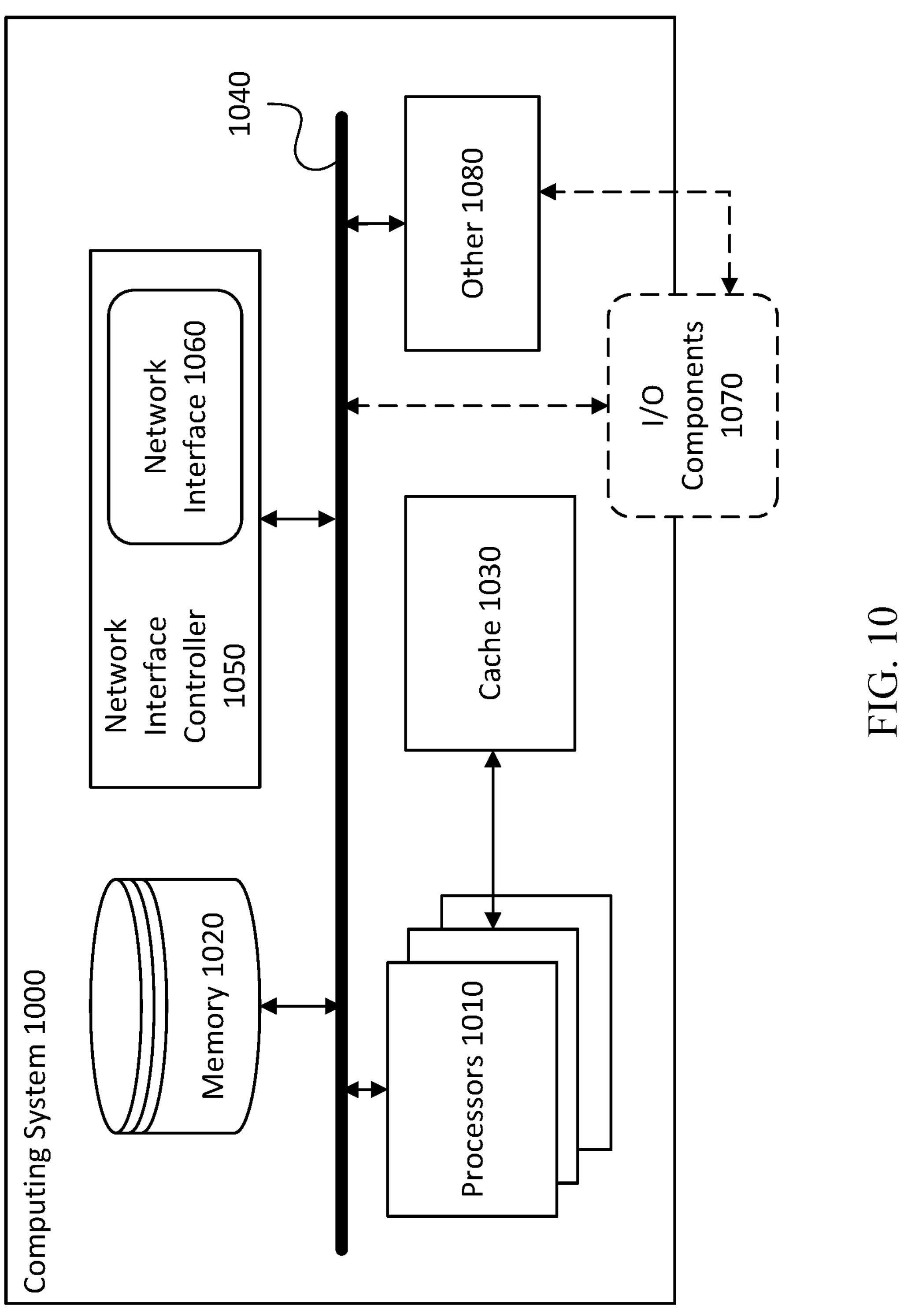
FIG. 10 depicts an example computing system according to aspects of the disclosure.

FIG. 10 depicts an example computing system 1000, which can be configured as the service control plane 310 of FIG. 3. The computing system 1000 can include one or more processors 1010 in communication with memory 1020, at least one network interface controller 1050 with network interface port 1060 for connection to a network, input/output (I/O) components 1070, and other components 1080. The processors 1010 can be in communication with the memory 1020, network interface controller 1050, I/O components 1070, and other components 1080 via a bus 1040, as an example. The processors 1010 can incorporate, or are connected to, cache memory 1030. In some instances, instructions are read from memory 1020 into cache memory 1030 and executed by the processors 1010 from cache memory 1030.

The processors 1010 can be any logic circuitry that executes instructions fetched from the memory 1020 or cache 1030. The processors 1010 can be microprocessor units or special purpose processors. The computing device 1000 can be based on any processor, or set of processors, capable of operating as described herein. The processors 1010 can be single core or multi-core processors. The processors 1010 can be multiple distinct processors. The processors 1010 can be implemented as circuitry on one or more chips.

The memory 1020 can be any device suitable for storing computer readable data. The memory 1020 can be a device with fixed storage or a device for reading removable storage media. Examples include all forms of non-volatile memory, media and memory devices, semiconductor memory devices, e.g., EPROM, EEPROM, SDRAM, and flash memory devices, magnetic disks, magneto-optical disks, and optical discs, e.g., CD ROM, DVD-ROM, or Blu-Ray® discs. The computing system 1000 can have any number of memory devices 1020.

The cache memory 1030 can be a form of computer memory placed in close proximity to the processors 1010 for fast access times. The cache memory 1030 can be part of, or on the same chip as, the processors 1010. There can be multiple levels of cache 1030, e.g., level 2 and level 3 cache layers.

The network interface controller 1050 can manage data exchanges via the network interface 1060. The network interface controller 1050 can handle the physical and data link layers of the open systems interconnection (OSI) model for network communication. Some of the tasks of the network interface controller 1050 can be handled by one or more of the processors 1010. The network interface controller 1050 can be incorporated into the processors 1010, e.g., as circuitry on the same chip.

The computing system 500 can have multiple network interfaces 1060 controlled by a single controller 1050 or multiple network interface controllers 1050. Each network interface 1060 can be a connection point for a physical network link, e.g., a cat-5 Ethernet link. The network interface controller 1050 can support wireless network connections and an interface port 1060 can be a wireless, e.g., radio, receiver/transmitter. The network interface controller 1050 can implement one or more network protocols such as Ethernet. The computing system 1000 can exchange data with other computing systems via physical or wireless links through a network interface 1060. The network interface 1060 can link directly to another device or to another device via an intermediary device, e.g., a network device such as a hub, a bridge, a switch, or a router, connecting the computing device 1000 to a data network such as the Internet.

The computing system 1000 can include, or provide interfaces for, one or more input or output (I/O) components 1070. Input devices can include keyboards, microphones, touch screens, sensors, and pointing devices, such as a mouse or trackball, as examples. Output devices can include video displays, speakers, and printers, as examples.

Other components 1080 can include an I/O interface, external serial device ports, and any additional co-processors. For example, the computing system 1000 may include an interface, e.g., a universal serial bus (USB) interface, for connecting input devices, output devices, or additional memory devices, e.g., portable flash drive or external media drive. The computing device 1000 can include an additional co-processor, such as a math co-processor to assist the processors 1010 with high precision or complex calculations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for performing machine learning model disaggregation, the method comprising:

generating, with one or more processors, a profile for a machine learning model by running a sample of the machine learning model on a sample dataset of a user project associated with an application of the machine learning model, the profile comprising a resource usage and application type for the machine learning model;

determining, with the one or more processors, a resource threshold to perform the application based on the resource usage and application type of the profile;

determining, with the one or more processors, a graph partition for components of the machine learning model based on the application type of the profile, a data transfer threshold, and connectivity topologies;

validating, with the one or more processors, that resources are available for the graph partition for the components of the machine learning model based on the resource threshold;

partitioning, with the one or more processors, the components of the machine learning model into a plurality of host nodes and at least one accelerator node based on the validating; and performing the application by executing the machine learning model based on the partitioning.

2. The method of claim 1, wherein the host nodes each comprise a processor for parsing operations and a memory comprising embedding tables.

3. The method of claim 1, wherein the accelerator node comprises a machine learning accelerator for neural network operations and a high bandwidth memory comprising model parameters or embedding tables.

4. The method of claim 1, wherein the data transfer threshold comprises at least one of a network bandwidth, latency, or throughput threshold to reduce hops between the host nodes and the accelerator node.

5. The method of claim 1, wherein the connectivity topologies comprise at least one of slicing of accelerators or hierarchies of network topologies.

6. The method of claim 1, wherein determining the graph partition for components of the machine learning model is further based on a statistical distribution of the machine learning model.

7. A system comprising:

one or more processors; and one or more storage devices coupled to the one or more processors and storing instructions that, when executed by the one or more processors, causes the one or more processors to perform operations for machine learning model disaggregation, the operations comprising:

generating a profile for a machine learning model by running a sample of the machine learning model on a sample dataset of a user project associated with an application of the machine learning model, the profile comprising a resource usage and application type for the machine learning model;

determining a resource threshold to perform the application based on the resource usage and application type of the profile;

determining a graph partition for components of the machine learning model based on the application type of the profile, a data transfer threshold, and connectivity topologies;

validating that resources are available for the graph partition for the components of the machine learning model based on the resource threshold;

partitioning the components of the machine learning model into a plurality of host nodes and at least one accelerator node based on the validating; and performing the application by executing the machine learning model based on the partitioning.

8. The system of claim 7, wherein the host nodes each comprise a processor for parsing operations and a memory comprising embedding tables.

9. The system of claim 7, wherein the accelerator node comprises a machine learning accelerator for neural network operations and a high bandwidth memory comprising model parameters or embedding tables.

10. The system of claim 7, wherein the data transfer threshold comprises at least one of a network bandwidth, latency, or throughput threshold to reduce hops between the host nodes and the accelerator node.

11. The system of claim 7, wherein the connectivity topologies comprise at least one of slicing of accelerators or hierarchies of network topologies.

12. The system of claim 7, wherein determining the graph partition for components of the machine learning model is further based on a statistical distribution of the machine learning model.

13. A non-transitory computer readable medium for storing instructions that, when executed by one or more processors, causes the one or more processors to perform operations for machine learning model disaggregation, the operations comprising:

generating a profile for a machine learning model by running a sample of the machine learning model on a sample dataset of a user project associated with an application of the machine learning model, the profile comprising a resource usage and application type for the machine learning model;

determining a resource threshold to perform the application based on the resource usage and application type of the profile;

determining a graph partition for components of the machine learning model based on the application type of the profile, a data transfer threshold, and connectivity topologies;

validating that resources are available for the graph partition for the components of the machine learning model based on the resource threshold;

partitioning the components of the machine learning model into a plurality of host nodes and at least one accelerator node based on the validating; and performing the application by executing the machine learning model based on the partitioning.

14. The non-transitory computer readable medium of claim 13, wherein the host nodes each comprise a processor for parsing operations and a memory comprising embedding tables.

15. The non-transitory computer readable medium of claim 13, wherein the accelerator node comprises a machine learning accelerator for neural network operations and a high bandwidth memory comprising model parameters or embedding tables.

16. The non-transitory computer readable medium of claim 13, wherein the data transfer threshold comprises at least one of a network bandwidth, latency, or throughput threshold to reduce hops between the host nodes and the accelerator node.

17. The non-transitory computer readable medium of claim 13, wherein the connectivity topologies comprise at least one of slicing of accelerators or hierarchies of network topologies.

18. The non-transitory computer readable medium of claim 13, wherein determining the graph partition for components of the machine learning model is further based on a statistical distribution of the machine learning model.

* * * * *